(No Model.) 5 Sheets—Sheet 3.

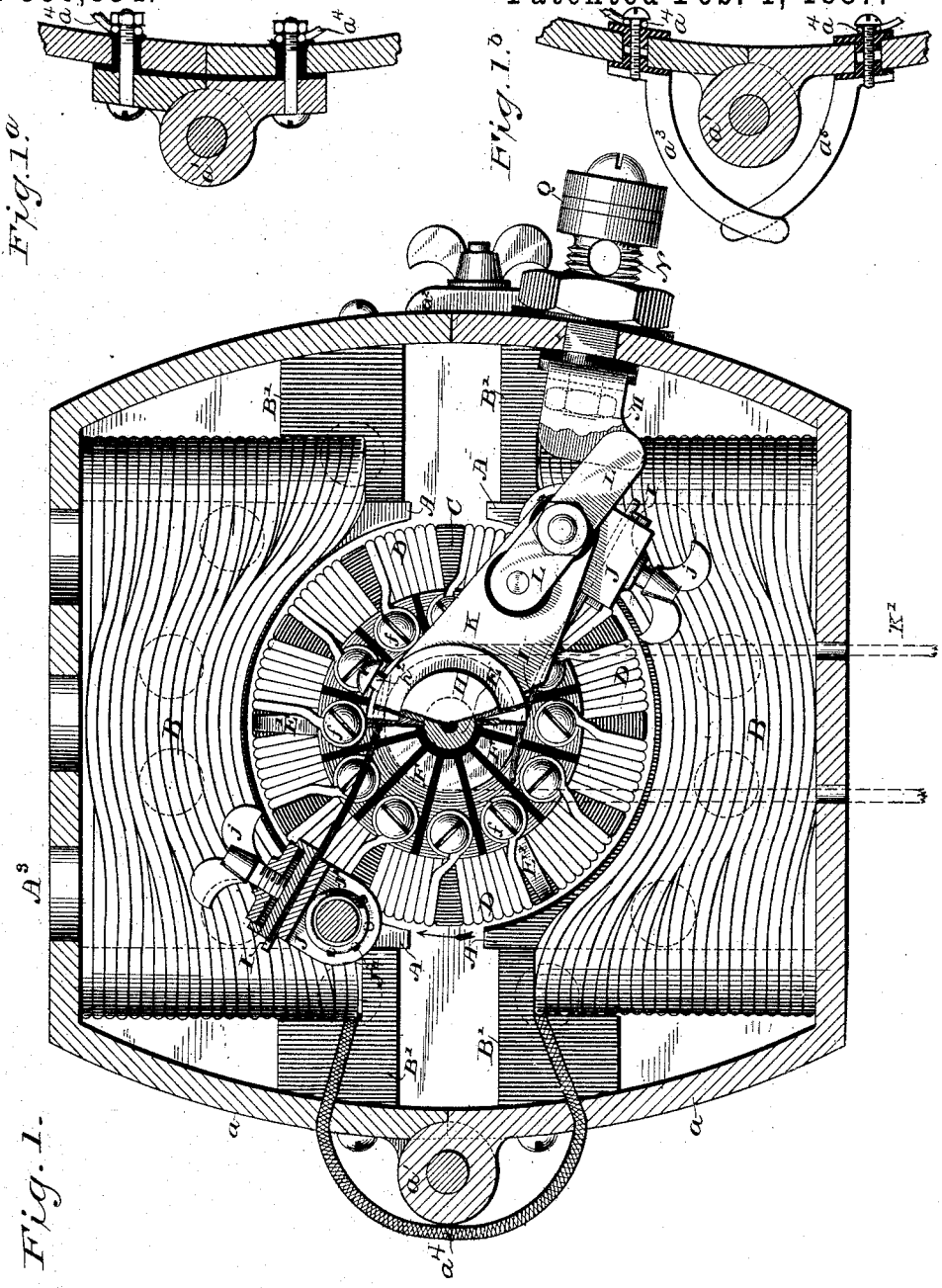

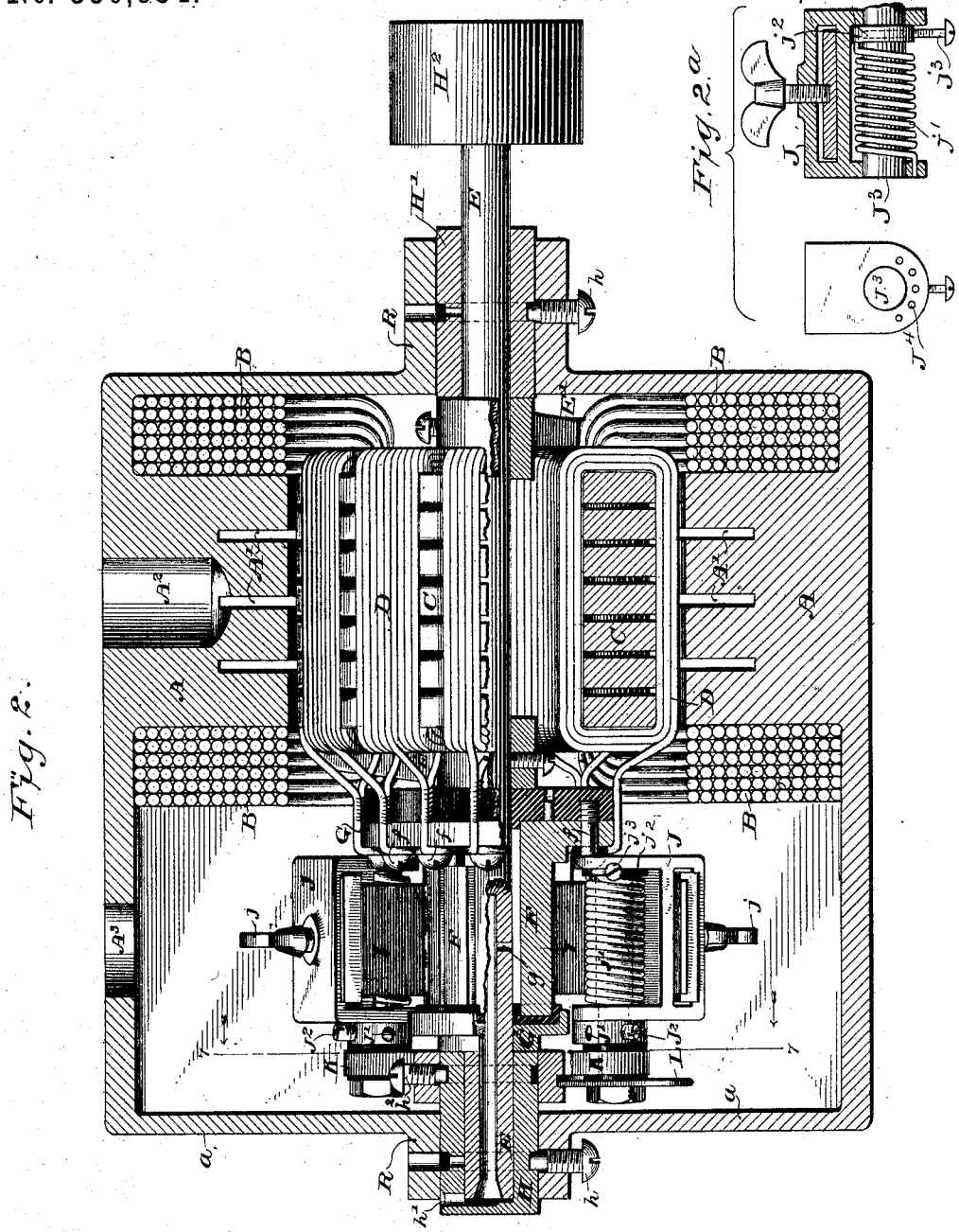

W. W. GRISCOM.
ELECTRIC MOTOR.

No. 356,834. Patented Feb. 1, 1887.

Witnesses
Geo. W. Young.
Henry A. Lamb.

Inventor
William W. Griscom.
By his Attorneys
Jammus Skinkle.

(No Model.) 5 Sheets—Sheet 4.
W. W. GRISCOM.
ELECTRIC MOTOR.
No. 356,834. Patented Feb. 1, 1887.
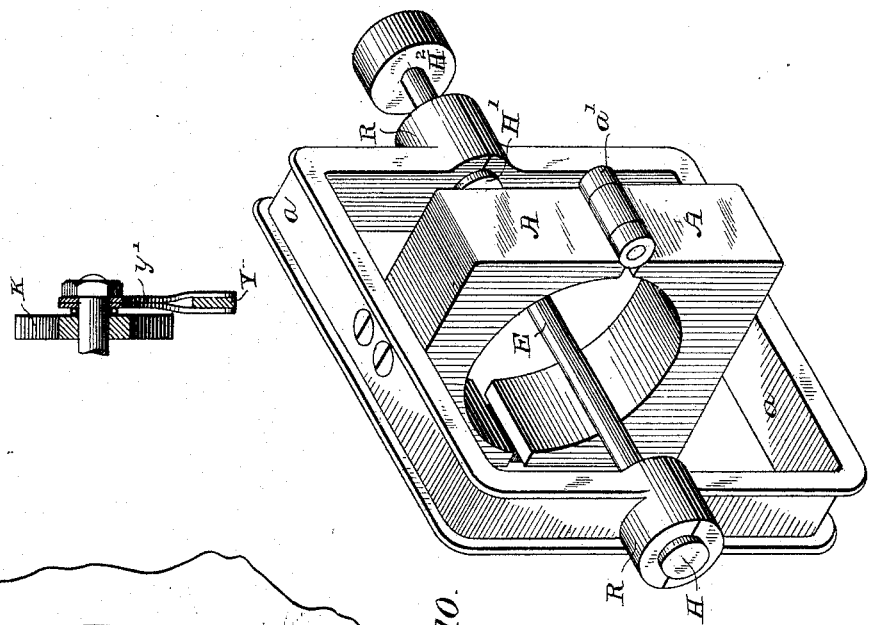
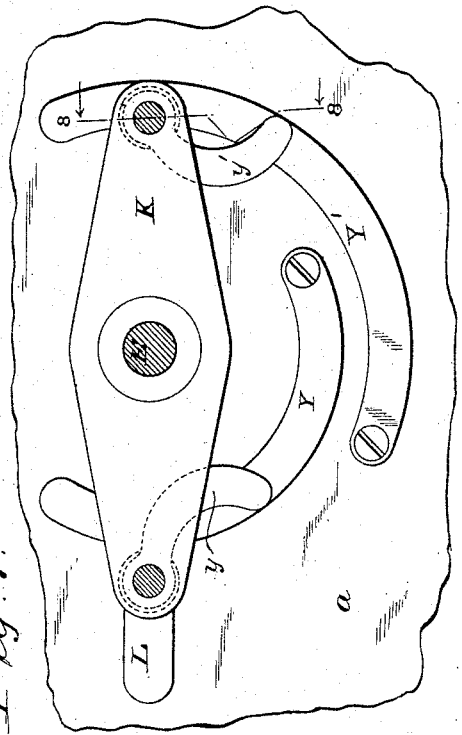
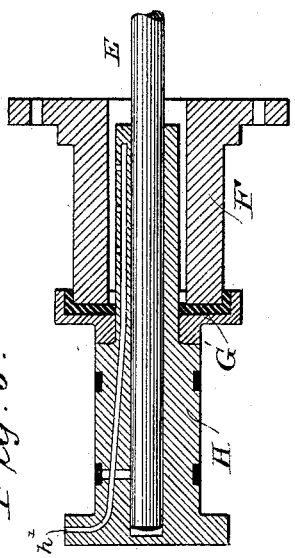
Witnesses
Geo W Young
Henry A. Lamb.
Inventor
William W. Griscom.
By his Attorneys
James S Hinkle

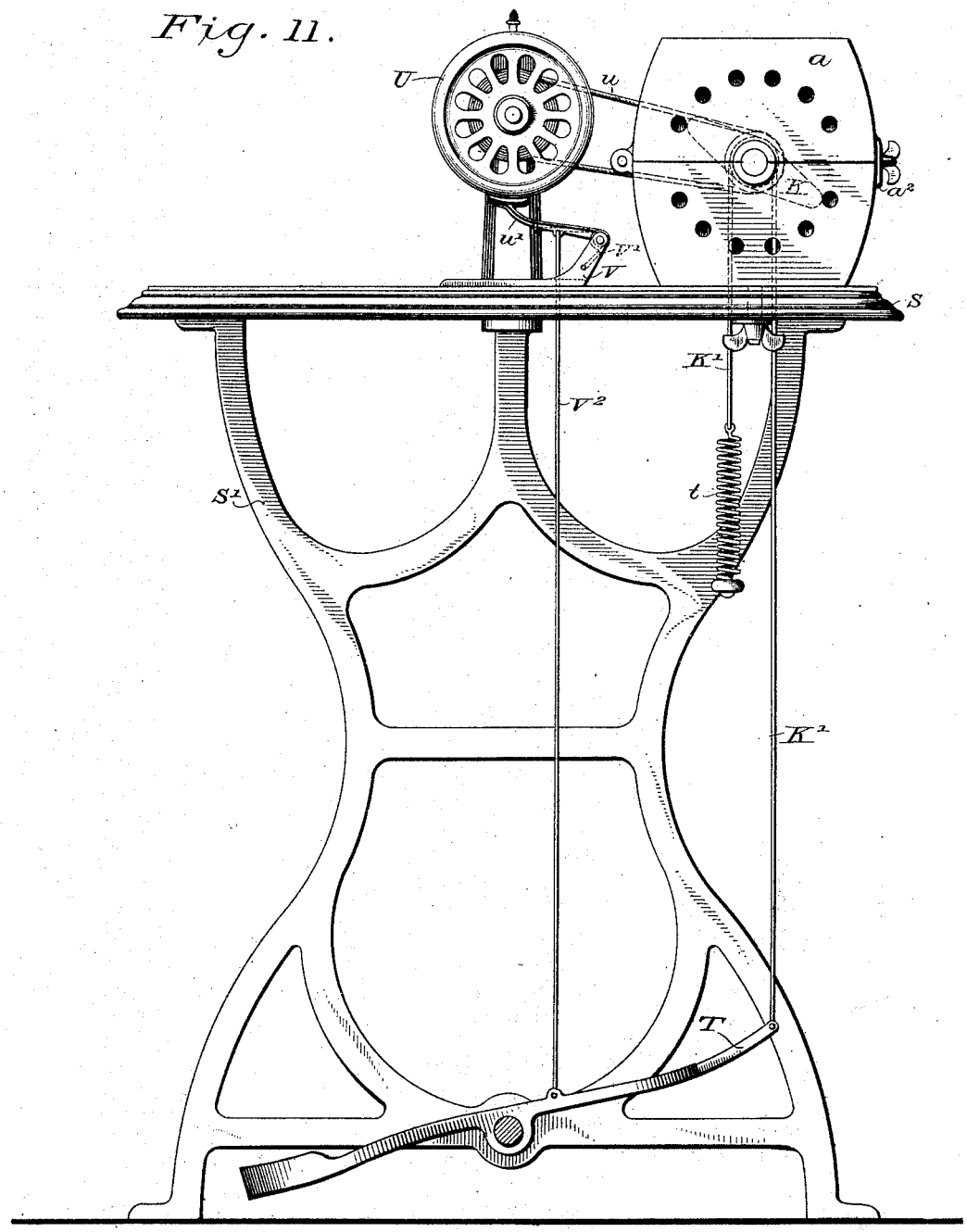

UNITED STATES PATENT OFFICE.

WILLIAM W. GRISCOM, OF HAVERFORD COLLEGE, PENNSYLVANIA.

ELECTRIC MOTOR.

SPECIFICATION forming part of Letters Patent No. 356,834, dated February 1, 1887.

Application filed August 25, 1885. Renewed January 3, 1887. Serial No. 223,230. (No model.)

*To all whom it may concern:*

Be it known that I, WILLIAM W. GRISCOM, a citizen of the United States, residing at Haverford College, in the county of Montgomery and State of Pennsylvania, have invented certain new and useful Improvements in Electric Motors, of which the following is a specification, reference being had therein to the accompanying drawings.

The present invention relates more particularly to that class of electric apparatus used in the translation of current strength into mechanical energy, and coming under the generic head of electric motors. The said improvements are also for some purposes applicable to the prime motor or dynamo-electric generator; but as these applications will be obvious to a person skilled in the art, I will describe my invention as applied to a motor.

My invention consists in improvement in the form and construction of the field-magnet and the disposition of its coils with respect to the armature, an improved armature-core, improved bearings for the shaft supporting the armature, means for ventilating and lubricating the commutator, and the combination, with the commutator-brush holder, of a cut-out switch and means whereby the main circuit is automatically closed through the switch when the commutator-brushes are at zero, or in the position of least efficiency; and it consists, further, in the various details of construction and arrangement hereinafter fully described.

Figure 4:
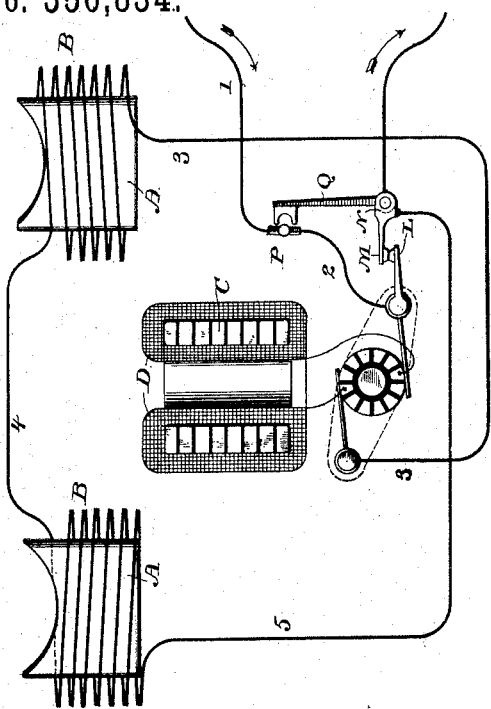
Figure 6:
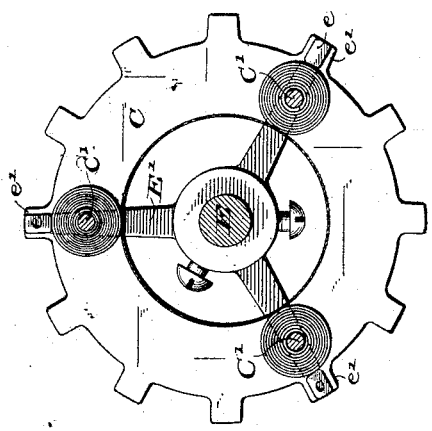
Figure 3:
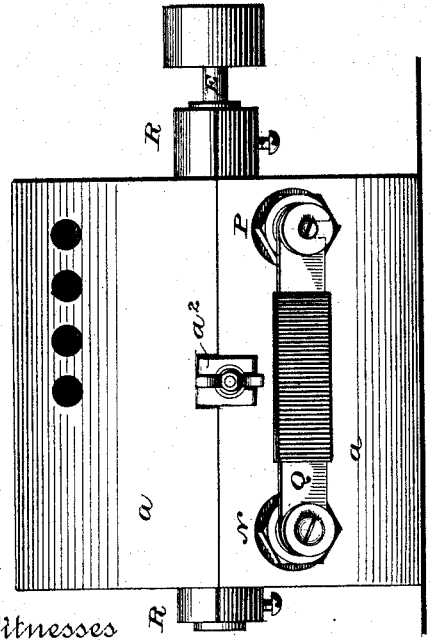
Figure 5:
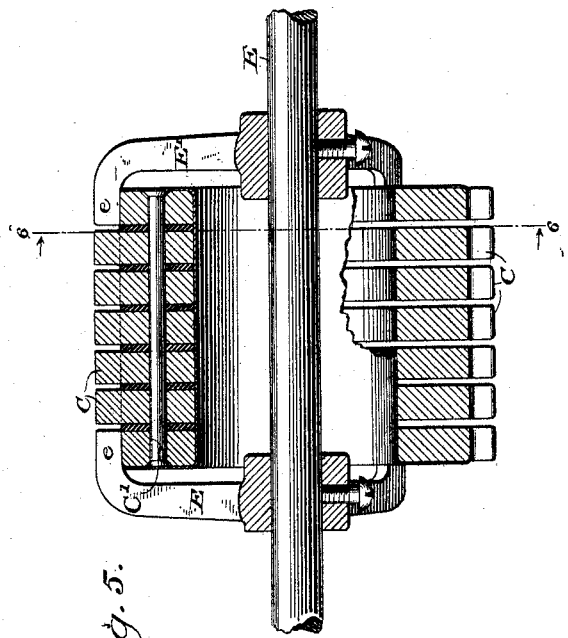

In the drawings, Figure 1 is an end elevation of the working parts of my improved motor, the exterior casing being removed at that side. Fig. 1ª is a detail view of the insulated hinge by which the two parts of the casing are secured. Fig. 1ᵇ is a modification of the above. Fig. 2 is a longitudinal sectional elevation, some of the parts being broken away in order to clearly show the construction. Fig. 2ª is a detail showing the preferred construction of the commutator-brush and spring-tension devices. Fig. 3 is an elevation showing the motor as a whole. Fig. 4 is a digrammatic representation of the several portions of the device, together with the connections, switches, and circuits through the same. Figs. 5 and 6 are detail views relating to the construction of the armature. Fig. 7 is a detail on the line 7 7 of Fig. 2, including the devices for carrying the current to the commutator-brushes not shown in said Fig. 2. Fig. 8 is a detail on line 8 8 of Fig. 7. Fig. 9 is a modification of the devices for supplying air and lubricant to the commutator. Fig. 10 is a perspective view of the frame of the machine as it may be constructed. Fig. 11 is a view in elevation showing the motor arranged to operate a sewing-machine, together with the mechanism for shifting the commutator-brushes and the brake for arresting the motion of the sewing-machine when the motor is cut out of circuit.

Similar letters denote like parts.

A A are the cores of the field-magnet, preferably of soft cast-iron, and these cores are formed integral with the halves $a$ $a$ of an approximately square iron box, within which all the working parts of the motor are contained. The two portions of the box field-magnet are fitted so as to be in magnetic contact when closed, and they are provided with a hinge, $a'$, and a pair of lugs, $a^2$, and suitable set-screws, by means of which they may be separated and brought together again with ease and certainty. The hinge that unites the two portions of the field-magnet box or frame may be insulated therefrom, as shown in Fig. 1ª, and serve as a portion of the circuit connecting the coils of the field-magnet. As shown in Fig. 1ᵇ, a pair of curved insulated arms, $a^3$ $a^4$, are fixed to the shell $a$, and, extending therefrom, intersect in line with the axis of the hinge, and so maintain a continuous contact.

The cores A A, in which are the recesses which take the place of polar extensions, are transversely slotted, as shown at A', some of the said slots communicating with apertures A², extending through the exterior of the box. Other openings, A³, are provided in various locations for the purpose of securing free circulation of air and dissipating as much as possible the heat generated during the use of the apparatus.

The poles A of the field-magnet terminate in concave faces, the outer extremities of which do not quite touch when the box is closed, and in that position there exists a cylindrical opening between them, within which the armature is rotated.

The field-magnet coils B are wound in such a manner as to almost entirely envelop the poles A, and by this means the most active portions of the coils—namely, those nearest the extremities of the helices B—are brought into the closest possible proximity to the armature, almost enveloping it on all sides.

B' are blocks of wood or other insulating material, which are placed above the upper edges of the sides of the helices B and securely fastened to the sides of the iron box for the purpose of holding the said helices in their operative position, yet, at the same time, the block being removable, the coils can be easily reached for inspection or repair, the absence of protecting cheek-pieces allowing them to be easily withdrawn or replaced.

The armature is composed of a number of iron disks, C, secured together and mounted transversely on the driving-shaft and provided with coils wound longitudinally thereon. The disks are open in the center, and sometimes provided with short teeth or projections on their periphery. The core is formed by uniting a number of disks by means of bolts or rivets C', passing transversely therethrough and permanently secured in position, a washer of asbestus cloth, paper, or other heat-resisting non-magnetic material being placed between each of the disks, so that when assembled they are all slightly separated.

The disks C are preferably formed by casting, and all the openings are made extra large to allow for slight irregularities, and I find that when assembled and permanently secured by the rivets C' as rigid and efficient a core is produced and at much less cost than when all the parts are accurately fitted. The core thus formed is then wound longitudinally with the helices D, forming the well-known ring-armature, the ends of each coil being looped and carried to the commutator in the well-known manner. I have only shown the winding here described by way of illustration, as I contemplate using other known forms, and many variations may be made in this respect without departing from the spirit of my invention.

The armature is secured in position upon and concentric with the shaft E by means of non-magnetic spiders E', which are mounted upon said shaft, their extremities $e$ fitting into recesses $e'$, formed in the outer disks, C. By spacing the disks of which the armature-core is constructed I provide for free circulation of air therethrough while the same is in motion, and I also localize and diminish the magnetic eddy-currents, and consequently the liability to excessive heating while in operation.

The commutator is composed of a number of L-shaped sections, F, each of which is separately secured to a disk, G, of insulating material, which is secured upon the shaft immediately in front of or to one of the spiders, close to the armature, the loops from which are carried over or through said disk G and connected to screws $f$, by which the sections are held in position. As shown, the sections F do not quite touch the shaft E, and they are also separated by a suitable space from each other; and in order to prevent displacement of their outer free ends I provide a recessed collar, G', which is lined with suitable insulating material and placed upon the shaft E, its recessed insulated portion fitting over and securing the ends of the commutator-sections, holding them absolutely concentric with the shaft, and preventing the escape of air and oil in any direction except centrifugally. The air-space by which the commutator-sections are separated from each other and from the shaft E, I find in practice to be sufficient insulation.

The shaft E is centrally apertured from the end nearest the commutator to a point about midway thereof, and from said central aperture one or more openings, $g$, lead to the space below the commutator-sections. The commutator end of this shaft is journaled in a tubular bearing or thimble, H, of any suitable material, which is supported within a suitable opening in the side of the box field-magnet, where it is securely held against endwise movement by a set-screw, $h$. The thimble H is provided with an inlet, $h'$, from which the oil is conveyed to the interior of the shaft E, as well as to the exterior thereof, and from whence it is ejected through the commutator together with a continuous stream of air.

A useful modification of the construction just described is shown in Fig. 9, where, instead of an apertured shaft, I show the thimble H as elongated and extending under the commutator, the extended portion carrying a continuation of the air and oil duct $g$, from which the oil and air are drawn and ejected through the commutator by tangential force when in motion, the shaft E in this case being solid. The opposite extremity of the shaft is supported within a bearing, H', entirely through which it passes, and is provided with suitable driving-pulley, H², at its free end. The bearing H' is removably secured by set-screw $h$ in the opposite side of the box field-magnet, and formed with suitable aperture, through which lubricant is conveyed to the shaft.

The two-part box $a$ $a$ may be wholly of iron; but, when desirable, it may be partly of iron and partly of wood or other materials, and it is formed with central projections that, when together, constitute bosses R R, which are bored out, as shown, to receive the bearings H H' of the armature shaft, which are thus rendered readily removable and replaceable, and at the same time are securely held in operative position when the box is closed and the motor in condition for work.

I have shown and heretofore referred to the supporting-frame in the form of a box containing and adapted to protect all the working parts; but, so far as the independent removable armature-shaft bearings are concerned, the box may be reduced to a skeleton frame—such, for instance, as is shown in Fig. 10—in which the cores of the field-magnet are hinged together by a non-magnetic hinge, and complete their magnetic circuit by means of a horizontally-divisible frame of magnetic metal placed around and secured to said cores, so that when they are separated the frame will part on the axial line of the machine. The said frame is provided with extensions or projections R R, as above described, which are similarly bored to receive and support the movable bearings, which latter may be plain tubes, as indicated; but for economy of power I prefer the improved anti-friction devices known as "ball-bearings."

The commutator-brushes I I are secured within rocking frames J J, mounted upon spindles $J^3$ at the extremities of a yoke, K, which is centrally apertured and journaled upon the exterior of the inner end of the thimble H, upon which it is to rotate. The rocking frames J are provided with thumb-screw $j$, by which the brushes are removably secured in the desired position. Helical springs $j'$ are placed upon the spindles $J^3$, and serve to regulate the pressure of the brushes upon the commutator. The side of the frames J are formed with a number of holes, as shown at $J^4$, for the reception of the extremities of the springs $j'$, the other ends thereof being attached to collars $j^2$, which are adjustably secured upon the spindles $J^3$ by means of suitable set-screws $j^3$, working in grooves in the said spindles, and by means of which and the holes $J^4$ the pressure of both springs can be equalized. The collars and set-screws $j^2 j^3$ not only enable me to regulate the pressure of the two springs, but they serve to secure the frames in position on the spindles, which, when said set-screws are loosened, can be readily removed therefrom for inspection, cleaning, or repair, and as readily replaced.

The yoke K, as shown, is mounted upon one of the tubular bearings of the main shaft, being secured thereto by the set-screw $h^2$, working in a suitable groove therein. The tubular bearing, being, as described, detachably secured in recesses in the side of the box-magnet when the box is open, the armature and commutator are removed together; but, if desired, a flange may be formed upon the interior of the box-magnet, and upon this yoke and commutator-brushes may be independently supported. The frames J are insulated from the yoke K, flexible conductors being secured in the apertures J' in the frames J by set-screws $J^2$, and at one end of the said yoke I provide a projecting contact-piece, L, which in a predetermined position of the commutator-brushes comes between the parts of a double spring or other suitable self-adjusting contact, M, located in the path of the projection L and suitably insulated from the metallic box.

Instead of the flexible conductors above referred to, I may use the sliding metallic connection shown in Figs. 7 and 8, which consists of a pair of curved contact-strips, Y Y', secured to the wall of the box $a$, but insulated therefrom and connected, respectively, to the positive and negative line-wires, and normally in contact with a pair of spring-contacts, $y y'$, secured to the extremities of the yoke K, and each electrically connected to one of the brush-carrying frames. In order to permit the removal of the armature and connections, as above described, it is only necessary to turn the contacts $y y'$ upon their axes until they are clear of the strips, when the parts can be removed and replaced without difficulty. On the exterior of the box are secured the main binding-posts P and N, both of which are provided with square shanks $n$, which are properly insulated from and securely attached to the walls of the box $a$. The body of each binding-post is screw-threaded and fitted with a suitable nut traveling thereon. The outer end of each post is divided or grooved for the reception of a metallic switching-strip, which swings freely thereon. Near the outer end of each binding-post is formed a transverse aperture, $n'$, into which is placed the line-wire, by turning the nut up against which the wire is firmly clamped between the nut and the end of the post, making a perfect electrical connection. A bar of conducting material, Q, is pivoted to one of the main binding-posts, and arranged to be readily replaced in contact with the other one, as described, thereby entirely cutting the motor out of circuit, as shown in Fig. 3.

A cord, K', is attached to the yoke K, and its two ends, passing through apertures in the box $a$ $a$, extend downward through suitable apertures in the table S, one end thereof being secured to the treadle T and the other to a fixed retracting-spring, $t$. With this construction it will be understood that the yoke K, and with it the commutator-brushes, will by the tension of the spring $t$ be normally held in any desired position, which for the present purpose is that of least efficiency, or zero, from which point they will be readily moved by pressure upon the treadle, and instantly returned when the pressure is removed.

S' is the frame upon which the mechanism is supported. U is the balance-wheel of a sewing-machine, to which the motor is connected by a band, $u$, and $u'$ is a friction-brake mounted upon a bracket, V, of any suitable description, and normally held against the periphery of said balance-wheel by a suitable spring, V'.

$V^2$ is a connection between the brake-lever and the treadle, and when the treadle is depressed for the purpose of raising the commutator-brushes and starting the motor the brake will at the same time be drawn away from the balance-wheel. When the treadle is released, the spring $t$ returns the commutator-brushes to their zero-point, and at the same time the spring V' applies the brake to the balance-wheel of the sewing-machine, stopping it without loss of time.

The cord K', as well as the connection V', may be made rigid, instead of flexible, and an obvious modification of the systems of retracting-springs shown would be the attachment of a weight at the opposite end of the treadle P, by which substantially the same effects as just described would be attained.

The electrical construction and circuits shown in Fig. 4 are as follows: by conductor 1 to binding-post P, thence by conductor 2 to the commutator and into and through the armature from the opposite brush by conductor 3 to one coil of the field-magnet, thence by conductor 4 to the other coil of the field-magnet, and thence by conductor 5 to the negative binding-post N and to line. The projection L operates as a switch, and when the commutator-brushes are at zero it is brought between the leaves of the spring-contact M, which is in electrical contact with the negative binding-post N, and serves to short-circuit the machine through the conductor 2 when the brushes are moved away from their effective positions and it is desired to stop the motor.

The operation of the device is as follows: The main switch Q being open, the current passes from binding-post P through conductor 2, cut-out L M, and negative binding-post to line, the brushes I I being in the position where they are normally held by the retracting-spring—namely, that of least efficiency—which in the present instance is on a line passing vertically through the centers of the polar extensions A. Upon depressing the treadle the force of the spring will be overcome and the brushes be moved in the direction of the arrow, which will break the contact between L and M and cause the current to flow through the armature and field-magnets, whereupon the armature will begin to rotate.

Starting from the position of least efficiency, my improved motor receives current gradually, and, instead of the entire force being concentrated upon it in an instant, the application of current is cumulative, so that if after the machine has been started the speed of rotation is not sufficient, all that is necessary is that the treadle be further depressed by the operator, which will then give more and more speed until the limit of safety or the required speed is reached. When the work has been finished, a gradual release of the pressure upon the treadle allows the spring to move the commutator-brushes higher and higher toward the center of the field-magnet, and when they have reached their position of least efficiency, instead of permitting the current to flow through the armature and be wasted, the cut-out L M is brought into action and the machine automatically short-circuited and stopped until it is again required to be used.

The present motor is designed for the operation of sewing-machines, and it is estimated that such a machine is only in use one-fifth of the time. By providing the cut-out arrangement just described I am enabled to operate large numbers of machines together with a current sufficient for one-fifth of the total number, each machine being entirely cut out during its period of inactivity.

What I claim is—

1. In an electric motor, a field-magnet the cores of which are expanded so as to form a divisible box or casing adapted to contain all the working parts of the machine, as set forth.

2. In an electric motor, a field-magnet consisting of a two-part iron box formed with inwardly-projecting field-cores, and provided with suitable helices surrounding and inclosing said cores, as described.

3. In an electric motor, a field-magnet composed of an iron shell forming a magnetic circle, and having field-cores projecting inwardly therefrom, and formed so as to inclose a cylindrical circular space between their faces, and magnetizing-helices the outer coils of which conform to the curve of the extremity of the field-cores, as set forth.

4. In an electric motor, a field-magnet consisting of a two-part iron box formed with inwardly-projecting field-cores, said extensions being in juxtaposition when the box is closed, and formed with concave cylindrical faces inclosing a circular space adapted to receive the armature, and having magnetizing-helices extending to the extreme outer edges of the polar recesses, so as to almost entirely envelop the armature, as set forth.

5. In an electric motor, the two-part box field-magnet core $a\ a$, having field-cores A, suitably faced to receive the armature, and having transverse air-passages A', and vent-holes $A^2$ $A^3$, and provided with the hinge $a'$ and a suitable fastening, as set forth.

6. In an electric motor, the combination, with a two-part box field-magnet divided on its central line and suitably hinged, and formed with the hollow extensions R R, of the armature-shaft E, and the removable bearings H H', fitting into and adapted to be securely held within the projections R R when the box is closed, as set forth.

7. In an electric motor, a commutator the segments of which are separated from each other by an air-space, a perforated supporting-shaft, or its described equivalent, from which said segments are also separated, an air and oil duct extending to the space between the commutator-sections and the shaft, and an independent bearing inclosing and supporting the end of said shaft, and suitably perforated for the reception and conveying of lubricant to the space within the commutator, as set forth.

8. In an electric motor, the combination, with suitably-mounted yoke or brush arm provided with contact-springs extending therefrom, of curved contact-strips located in the path of the springs through the entire range of adjustment of the brush-arm, as set forth.

9. In an electric motor, the combination, with adjustable commutator-brushes, and means, substantially as described, for supporting the same adjustably, of a contact carried by said brush-supporting devices, a contact in the path thereof, and suitable electric connections for automatically short-circuiting the motor when the brushes are placed at zero, as set forth.

10. In an electric motor, the combination, with the commutator, of the suitably-mounted yoke-piece K, carrying brush-holding devices J J at its extremities, and the contact-piece L projecting from one end thereof, the split contact M, and electric connections, substantially as set forth, whereby the moving of the contact-brushes to the position of least efficiency, or zero, closes a circuit extending between the main binding-posts, as set forth.

11. The combination, with the shell $a$ and main binding-posts P and N, secured to and suitably insulated therefrom, of the cut-out Q, substantially as and for the purpose described.

12. In an electric motor, a field-magnet consisting of a two-part iron box having inwardly-projecting cores, suitable helices surrounding said cores, a hinge uniting the parts of the box, but insulated therefrom, and connections, as described, whereby the said hinge is included in the circuit of the field-magnet, as set forth.

13. In an electric motor, the combination, with a commutator and a suitable armature and field-magnets, of a pair of brushes, an adjustable support therefor, said support being also provided with a contact device adapted to close a circuit between the binding-posts, a pivoted lever, connections between the lever and the commutator-brush supports, a retracting-spring, and mechanical connections between the brush-holder and the pivoted lever, whereby the motion of the lever is communicated to the commutator-brushes to propel them in one direction, the said brushes being automatically returned to their first position when released, as set forth.

14. In an electric motor, the combination, with a commutator, a suitable armature and field-magnet, of a pair of commutator-brushes, an adjustable support therefor, said support being also provided with a contact device adapted to close a circuit between the binding-posts when the brushes are in their position of least efficiency, at zero, a pivoted lever, and a retracting-spring, and mechanical connections between the brush-holder and the lever, whereby the application of pressure by the operator to the lever will move the commutator-brushes away from their normal position and start the machine, and when released said spring will automatically return the brushes to their zero-point and at the same time close the cut-out circuit between the main binding-posts and around the armature, as set forth.

15. The combination, with a wheel or other device to be driven, of a brake normally opposing the rotation of said wheel, a motor normally out of circuit, a pivoted lever to which the brush-arm of the motor and the brake-lever are connected, so that the brushes can be moved from zero and the brake lifted simultaneously by a movement of the said lever, and means for automatically returning the brushes to zero and applying the brake when the lever is released, substantially as described.

16. In an electric motor, the combination, with a commutator, a suitable armature and field-magnet, of a pair of commutator-brushes, an adjustable support therefor, said support being also provided with a contact device adapted to close a circuit between the binding-posts when the brushes are in their position of least efficiency, at zero, a wheel to be driven, and a brake normally opposing the movement thereof, a pivoted lever, and a retracting-spring and mechanical connections between the brush-holder and the lever, and the lever and brake, whereby the movement of the lever by the operator will carry the commutator-brushes away from their normal position, at zero, and at the same time remove the brake from the wheel and allow the apparatus to start, and when released said spring will automatically return the brushes to zero and close the by-pass circuit and simultaneously apply the brake to the machine being driven, as set forth.

In testimony whereof I have hereunto subscribed my name this 24th day of August, A. D. 1885.

WILLIAM W. GRISCOM.

Witnesses:
JAMES CROWE,
HENRY S. DOTTERER.